United States Patent [19]

Spadaccini et al.

[11] Patent Number: 5,232,672
[45] Date of Patent: Aug. 3, 1993

[54] ENDOTHERMIC FUEL SYSTEM

[75] Inventors: Louis J. Spadaccini; Pierre J. Marteney, both of Manchester, Conn.

[73] Assignee: United Technologies Corporation, Hartford, Conn.

[21] Appl. No.: 920,814

[22] Filed: Jul. 24, 1992

Related U.S. Application Data

[63] Continuation of Ser. No. 701,420, May 15, 1991, abandoned.

[51] Int. Cl.$^5$ .......................... F28D 00/00; B01J 8/02
[52] U.S. Cl. ...................... 422/198; 422/211; 422/222; 60/39.12; 60/266; 60/267; 62/7
[58] Field of Search ............ 60/39.12, 266, 267; 62/7; 422/198, 211, 222

[56] References Cited

U.S. PATENT DOCUMENTS

| | | | |
|---|---|---|---|
| 2,655,786 | 10/1953 | Carr | 60/39.12 |
| 2,951,883 | 9/1960 | Kroeper et al. | 585/135 |
| 2,979,293 | 4/1961 | Mount | 62/7 |
| 3,006,142 | 10/1961 | Carr | 152/504 |
| 3,357,916 | 12/1967 | Smith | 422/198 |
| 3,438,602 | 4/1969 | Noddings et al. | 422/211 |
| 3,690,100 | 9/1972 | Wolf et al. | 60/267 |
| 3,855,980 | 12/1974 | Weisz et al. | 123/3 |
| 4,185,456 | 1/1980 | Cummings | 60/39.12 |
| 4,273,304 | 6/1981 | Frosch et al. | 60/267 |

OTHER PUBLICATIONS

"Endothermic Fuels for Hypersonic Vehicles," By Lander et al., Journal of Aircraft, vol. 8,1 No. 4, pp. 200-207; 1971.

Primary Examiner—Robert J. Warden
Assistant Examiner—Christopher Y. Kim
Attorney, Agent, or Firm—George J. Romanik

[57] ABSTRACT

An endothermic fuel system for cooling a heat source, which may be on a high speed vehicle, has an endothermic fuel decomposition catalyst which is capable of endothermically decomposing an endothermic fuel. The system also includes means for transferring thermal energy from the heat source to the catalyst in order to heat the catalyst to a temperature sufficient to endothermically decompose at least a portion of the endothermic fuel and to cool the heat source and means for contacting the heated catalyst with the endothermic fuel stream to cause the endothermic fuel stream to absorb the thermal energy and endothermically decompose into reaction products.

23 Claims, 2 Drawing Sheets

ENDOTHERMIC FUEL SYSTEM

This invention was made with Government support under contract number F33615-87-C-2744 awarded by the Department of the Air Force. The Government has certain rights in this invention.

This application is a continuation of U.S. application Ser. No. 07/701,420 filed on May 15, 1991, now abandoned.

CROSS REFERENCE TO RELATED APPLICATIONS

This application is related to U.S. application Ser. No. 07/701,430 filed on May 15, 1991 entitled "Method of Cooling with an Endothermic Fuel", and commonly assigned U.S. application Ser. No. 07/701,429 filed on May 15, 1991 entitled "Method of Cooling with an Endothermic Fuel".

TECHNICAL FIELD

The present invention relates to a system for using endothermic fuels to cool heat sources, particularly heat sources on high speed aircraft.

BACKGROUND ART

The performance and mission applications of future ramjet and scramjet powered vehicles are highly dependent on protecting the engines and airframe from high heat loads encountered at hypersonic speeds. As aircraft flight speeds increase to the high supersonic and hypersonic regimes, aerodynamic heating becomes increasingly severe and critical demands are placed on the structural and thermal capabilities of the engines and airframe. At flight speeds near Mach 4, the air taken on board these vehicles will be too hot to cool the engines and airframe. Therefore, it will probably be necessary to use the fuel as the primary coolant.

Cooling systems which use the latent and sensible heat capacities of aircraft turbine fuels have long been used on high performance aircraft. Such systems, though, are generally limited to moderate temperature applications to prevent fouling caused by thermal decomposition of the fuel. As a result, these systems may not be appropriate for use on high speed vehicles in which relatively high temperatures will be encountered.

Cryogenic cooling systems which use fuels such as liquid hydrogen or methane could provide sufficient cooling for high speed vehicles and would not have problems with fouling caused by fuel decomposition. However, such systems have drawbacks which may make them impractical. For example, cryogenic systems require large tank volumes, hence large vehicles, to hold sufficient fuel because cryogenic fuels have low densities. In addition, maintaining the fuels at cryogenic temperatures presents formidable logistics and safety problems, both on the ground and during flight, especially as compared to conventional aircraft turbine fuels.

An alternate approach would be to use an endothermic fuel cooling system to provide engine and airframe cooling. Endothermic fuel systems use fuels which have the capacity to absorb an endothermic heat of reaction in addition to sensible and latent heat. As a result, the fuel is capable of absorbing two to four times as much heat as fuels which only absorb sensible and latent heat and up to twenty times more heat than conventional aircraft turbine fuels. Furthermore, endothermic fuels offer storage and handling advantages over cryogenic fuels because they are liquids under ambient conditions on the ground and at high altitudes, and have higher densities than cryogenic fuels.

Most work with endothermic fuel systems has been limited to systems in which a naphthene is dehydrogenated over a precious metal catalyst. For example, a system in which methylcyclohexane (MCH) is dehydrogenated to hydrogen and toluene over a platinum on alumina catalyst has been demonstrated to provide a total heat sink of about 1900 Btu/lb. While the system design contemplated heat transfer between hot engine and airframe components to provide the heat of reaction, only a rudimentary means for transferring heat from compressor bleed air was described. Despite its feasibility, such a system might not be adequate to provide sufficient cooling for very high speed vehicles and can present problems with short catalyst life, catalyst poisoning, special fuel handling and storage considerations, and reaction products having poor combustion properties.

Accordingly, what is needed in the art is a system for cooling high speed vehicles using an endothermic fuel which provides a high total heat sink, yields products with superior combustion characteristics, does not require precious metal catalysts, and which has handling and storage characteristics similar to those of conventional aircraft turbine fuels.

DISCLOSURE OF THE INVENTION

The present invention is directed to a system for cooling high speed vehicles using an endothermic fuel which provides a high total heat sink, yields products with superior combustion characteristics, does not require precious metal catalysts, and which has handling and storage characteristics similar to those of conventional aircraft turbine fuels.

One aspect of the invention includes a system for cooling a heat source having an endothermic fuel decomposition catalyst which is capable of cracking or dissociating an endothermic fuel selected from the group consisting of a liquid distillate hydrocarbon fuel or methanol. The system also includes means for transferring thermal energy from the heat source to the catalyst, thereby cooling the heat source and heating the catalyst to a temperature sufficient to crack or dissociate at least a portion of an endothermic fuel stream, and means for contacting the heated catalyst with the endothermic fuel stream at a liquid hourly space velocity of at least about 10 hr$^{-1}$, thereby causing the endothermic fuel stream to crack or dissociate into a reaction product stream. If the endothermic fuel is a liquid distillate hydrocarbon fuel, the reaction product stream will contain hydrogen and unsaturated hydrocarbons. If the endothermic fuel is methanol, the reaction product stream will contain hydrogen and carbon monoxide.

Another aspect of the invention includes an endothermic fuel system in which an endothermic fuel decomposition catalyst is positioned in a reaction zone which is in direct thermal contact with a hot engine or airframe component such that thermal energy can flow directly from the hot component to the reaction zone to heat the catalyst to a temperature sufficient to endothermically decompose at least a portion of an endothermic fuel stream and cool the hot component. The system also includes means for contacting the heated catalyst with the endothermic fuel stream to cause the endothermic fuel stream to absorb the thermal energy and endothermically decompose into a reaction product stream.

Another aspect of the invention includes an endothermic fuel system for cooling two heat sources on a high speed vehicle which has an endothermic fuel decomposition catalyst, means for transferring thermal energy from a first heat source to the catalyst to cool the first heat source and heat the catalyst, and means for transferring thermal energy from a second heat source to an endothermic fuel stream to cool the second heat source and heat the endothermic fuel stream. The system also includes means for contacting the heated catalyst with the heated endothermic fuel stream to cause the endothermic fuel stream to absorb additional thermal energy and endothermically decompose into a reaction product stream.

The foregoing and other features and advantages of the present invention will become more apparent from the following description and accompanying drawings.

BEST MODE FOR CARRYING OUT THE INVENTION

Figure 1:
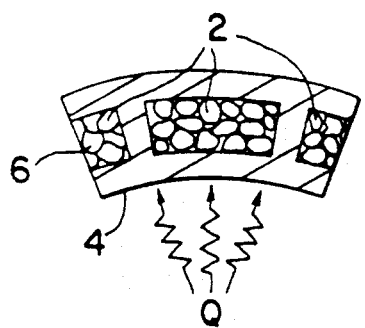
FIGS. 1 and 2 are cross-sectional views of an aircraft engine combustion chamber wall having reaction zones which contain an endothermic decomposition catalyst.

The present invention is compatible with any endothermic fuel capable of undergoing an endothermic decomposition reaction. An endothermic decomposition reaction is one in which an endothermic fuel is catalytically decomposed into reaction products having lower molecular weights than the original endothermic fuel after absorbing a heat of reaction. Typically, endothermic decomposition reactions take place in the gas phase, providing an opportunity to transfer sensible and latent heat to the fuel in addition to a heat of reaction. Common endothermic decomposition reactions include the dehydrogenation of naphthenes to hydrogen and aromatics, the dehydrocyclization of paraffins to hydrogen and aromatics, the dissociation of methanol to hydrogen and carbon monoxide, and the cracking of hydrocarbons to hydrogen and a mixture of saturated and unsaturated hydrocarbons.

Fuels capable of undergoing dehydrogenation or dehydrocyclization reactions include $C_6$ to $C_{20}$ naphthenes, such as methylcyclohexane and cyclohexane, and normal paraffins having up to about 20 carbon atoms. The dehydrogenation or dehydrocyclization of these fuels may be catalyzed by any catalyst which promotes dehydrogenation, dehydrocyclization, or similar reactions. In particular, platinum, rhodium, iridium, palladium, nickel, chromium, cobalt, mixtures thereof, and zeolites supported on alumina or a similar substrate in the form of granules, extrudates, pellets, honeycombs, or any other conventional form have been found to be effective catalysts. Platinum, rhodium, iridium, palladium and mixtures thereof are preferred because of their greater effectiveness in catalyzing dehydrogenation and dehydrocyclization reactions. In order to dehydrogenate or dehydrocyclize at least of portion of the endothermic fuel, the catalyst should be contacted with the fuel at temperatures of about 200° F. to about 1400° F., preferably about 400° F. to about 1000° F., and pressures of about 0.1 atmosphere (atm) to about 70 atm.

Fuels capable of undergoing cracking reactions include liquid distillate hydrocarbon fuels, such as $C_2$ to $C_{20}$ normal paraffins, $C_3$ to $C_{20}$ isoparaffins, and conventional aircraft turbine fuels, as disclosed in U.S. application Ser. Nos. 07/701,430 and 07/701,429, filed on May 15, 1991, which are herein incorporated by reference. The liquid distillate hydrocarbon fuels may be pure components or mixtures of components and may have boiling points or ranges between about 200° F. to about 700° F. and specific gravities at 60° F. between about 0.65 and about 0.85. Preferably, the liquid distillate hydrocarbon fuels will have aromatic contents of less than about 25 volume percent and flash points higher than about 100° F. Most preferably, the liquid distillate hydrocarbon fuels will have high paraffin contents and, in particular, high normal paraffin contents.

Catalysts which have been found to be effective in catalyzing the cracking of liquid distillate hydrocarbons include chromium in the form of chromia; precious metal catalysts such as platinum, rhodium, iridium, ruthenium, palladium, and mixtures thereof; and zeolites. Chromium catalysts used for the present invention should contain about 5 weight percent (wt %) to about 33 wt % chromia, and preferably, about 25 wt % to about 30 wt % chromia. Precious metal catalysts used for the present invention should contain about 0.01 wt % to about 5 wt % precious metal. Preferably, the precious metal catalysts will contain about 0.1 wt % to about 1.0 wt % precious metal, and most preferably, about 0.3 wt % to about 0.5 wt % precious metal. In addition, the precious metal catalysts may contain promoters such as rhenium, as is known in the art. The chromium and precious metal catalysts may be supported on alumina or similar substrates in the form of granules, extrudates, pellets, honeycombs, or any other conventional form. Suitable chromium catalysts include Houdry Type C, a 30 wt % chromia/alumina catalyst which may be purchased from Air Products and Chemicals Company (Allentown, Pa.). Suitable precious metal catalysts include PR-8, a platinum-rhenium on alumina extrudate which may be purchased from American Cyanamid Company (Wayne, N.J.). Other suitable precious metal catalysts may be purchased from Engelhard Corporation (Iselin, N.J.) and UOP (Des Plaines, Ill.). Zeolites are the preferred catalysts for cracking liquid distillate hydrocarbons because they are more reactive and produce more unsaturated products than precious metal catalysts. The zeolites may be faujasites, chabazites, mordenites, silicalites, or any of the other types of zeolite known to catalyze hydrocarbon cracking and should have an effective pore diameter of about 3 Å to about 11 Å. Preferably, the zeolites will have an effective pore diameter of about 4 Å to about 8 Å. Suitable zeolite catalysts include Octacat, a faujasite which is available from W. R. Grace & Company (Baltimore, Md.), and several catalysts available from UOP (Des Plaines, Ill.) including SAPO-34 which is a chabazite, LZM-8 which is a mordenite, MFI-43, and MFI-47. The zeolites may be supported or stabilized in any suitable manner known in the art. For example, the zeolites may be supported on ceramic granules, extrudates, pellets, monoliths, or even metal foil honeycomb structures. Adhesion between the zeolite and support may be facilitated by mixing the zeolite with about 2 wt % to about 20 wt % of a colloidal material. Suitable colloidal materials include ceria; silica, such as Ludox LS ™ which is available from E. I. DuPont de Nemours & Company (Wilmington, Del.); and organic titanium esters, such as Tyzor ™ which is also available from DuPont.

Methanol is another endothermic fuel of the present invention because it has a large heat of vaporization, a high heat capacity, and can be endothermically dissociated to provide a high chemical heat sink and thermally stable products. Preferably, methanol will be used as a secondary endothermic fuel to supplement a primary endothermic fuel when high levels of cooling are required. The endothermic dissociation of methanol into hydrogen and carbon monoxide may be catalyzed by a mixture of about 35 wt % to about 80 wt % copper oxide and about 10 wt % to about 65 wt % zinc oxide. The catalyst may also contain up to about 25 wt % $Al_2O_3$. Suitable catalysts include L-951, a catalyst comprising 42 wt % CuO, 47 wt % ZnO, and 10 wt % $Al_2O_3$ as a stabilizer, which is available from United Catalyst Incorporated (Louisville, Ky.). The CuO-ZnO catalyst may be impregnated with about 0.5 wt % rhodium to increase its reactivity by wetting the catalyst with an aqueous rhodium nitrate solution.

In order to crack or dissociate at least a portion of the endothermic fuel, the catalyst should be contacted with the fuel at a pressure of about 1 atm to about 50 atm, preferably at a pressure above the fuel's critical pressure, and a liquid hourly space velocity (LHSV) of at least about 10 $hr^{-1}$, especially about 10 $hr^{-1}$ to about 1000 $hr^{-1}$. In particular, the present nvention has been demonstrated to provide cooling at a space velocity of about 20 $hr^{-1}$ to about 700 $hr^{-1}$. In some subsonic and supersonic aircraft applications, a space velocity between about 150 $hr^{-1}$ and about 250 $hr^{-1}$ would be acceptable. To crack liquid distillate hydrocarbons, the reaction temperature should be about 1000° F. to about 1500° F. and, preferably, about 1200° F. to about 1250° F. in order to achieve high conversions without using excessive temperatures. At the lower end of the temperature range conversions greater than about 60% are achievable. This is particularly true at temperatures of at least about 1100° F. At the higher end of the range, conversions greater than 90% can be obtained. To dissociate methanol, the reaction temperature should be about 500° F. to about 1200° F. and preferably, about 800° F. to about 1000° F.

Thermal energy to supply the heat of reaction to endothermically decompose at least a portion of the fuel may come from any heat source which is at a suitable temperature and, preferably, which requires cooling. The thermal energy is, in effect, recycled to the fuel, increasing the energy which can be extracted from the fuel and improving the efficiency of a system that incorporates the present invention. Preferably, the heat source will be located on an aircraft, such as a high speed aircraft, although the heat source may be ground-based, such as in a gas turbine power generation facility. If the heat source is located on an aircraft, the thermal energy may be supplied by hot engine components, such as combustion chamber walls; airframe components, such as nose and wing leading edges; compressor discharge air; or ram air taken into the engines. The engine and airframe components and hot air may be at temperatures of about 1200° F. or higher. It may be especially advantageous for the thermal energy to be supplied by a part which produces a detectible infrared signature, in which case, cooling the part will reduce the aircraft's infrared signature. The thermal energy may be transferred to the catalyst by direct contact with the heat source or by using a high temperature heat transfer fluid. The heat transfer fluid may be the fuel itself; air; a molten salt such as copper chloride, potassium chloride, or zinc chloride; a liquid metal such as sodium, potassium, lithium, bismuth, or alloys thereof; or any other suitable fluid.

The amount of thermal energy which can be absorbed by two endothermic fuels of the present invention is shown in the Table. Data for MCH, a prior art endothermic fuel, is provided for comparison.

TABLE

| Fuel | Heat Sink (Btu/lb) | | |
|---|---|---|---|
| | Chemical | Physical | Total |
| MCH | 894 | 1031 | 1925 |
| Isopar ™ H | 1100 | 981 | 2081 |
| JP-7 | 1100 | 925 | 2025 |

Heat transfer may be facilitated by using a heat exchanger-reactor which incorporates an endothermic decomposition catalyst in a reaction zone and is provided with means for transferring thermal energy from a heat source to the catalyst in order to heat the catalyst to a suitable reaction temperature and means for contacting the catalyst with an endothermic fuel to decompose the fuel. The reaction zone may be designed to provide the desired space velocity, pressure drop, and other parameters using conventional catalytic reactor design techniques.

Figure 2:
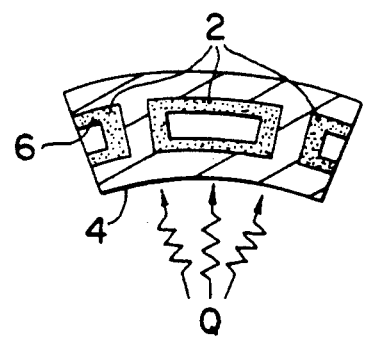

FIGS. 1 and 2 depict two configurations of a heat exchanger-reactor which can be used to directly cool a heat source, such as the wall of an aircraft engine combustion chamber. In each embodiment, a plurality of reaction zones 2 are built into the wall 4 of an aircraft engine combustion chamber such that the reaction zones 2 are in direct thermal contact with the combustion chamber wall 4. Each of the reaction zones 2 contains an endothermic decomposition catalyst 6 in any of the conventional forms known in the art. For example, the catalyst 6 may be provided as pellets, as shown in FIG. 1, or a coating on the walls of the reaction zones 2, as shown in FIG. 2. One skilled in the art would recognize that many different catalyst configurations would be possible and that similar reaction zones could be incorporated into other engine or airframe components. In both of these embodiments, the catalyst 6 is heated to a temperature sufficient to endothermically decompose at least a portion of an endothermic fuel by direct heat transfer through the combustion chamber wall 4 into the reaction zones 2. The fuel is directed into the reaction zones 2 by a pump (not shown) or other conventional device where it contacts the heated catalyst, absorbs a heat of reaction, and decomposes into a reaction product stream, thereby cooling the combustion chamber wall 4.

Figure 3:
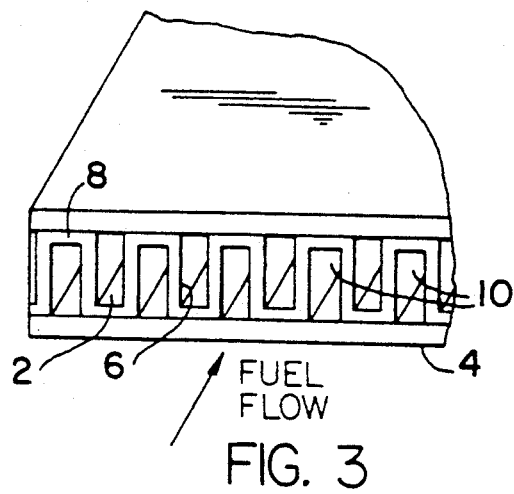
FIG. 3 is an isometric view of a portion of an aircraft engine combustion chamber wall having a honeycomb-shaped reaction zone which contains an endothermic decomposition catalyst.

FIG. 3 shows a similar system in which the reaction zone 2 is in the form of a honeycomb 8 built into the wall 4 of an aircraft engine combustion chamber such that the reaction zone 2 is in direct thermal contact with the combustion chamber wall 4. The honeycomb 8 has a plurality of passageways 10 coated with a catalyst 6 and may be made from alumina, metal foil, or any other conventional material. Using a coated honeycomb offers the advantages of reduced weight, negligible pressure loss, and increased thermal conductivity, especially if the honeycomb is metal. As in the previous embodiments, the catalyst 6 is heated to a temperature sufficient to endothermically decompose at least a portion of the endothermic fuel by direct heat transfer through the combustion chamber wall 4 into the reaction zone 2.

Figure 4:
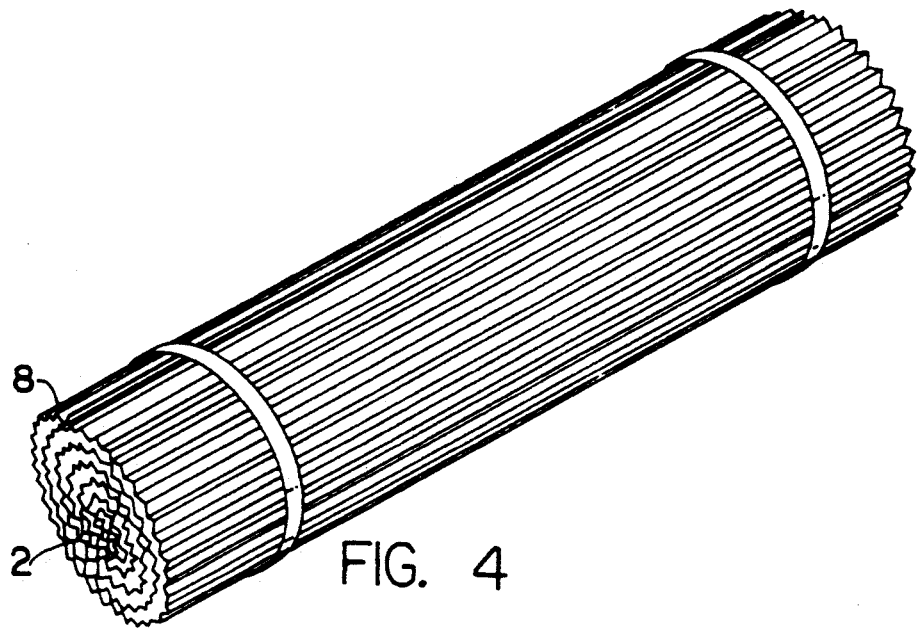
FIG. 4 is an isometric view of a cylindrical honeycomb reaction zone which contains an endothermic decomposition catalyst.

FIG. 4 depicts a cylindrical honeycomb heat exchanger-reactor which has a reaction zone 2 in the form of a honeycomb 8. The heat exchanger-reactor may be made by depositing a slurry of catalyst on a corrugated stainless-steel foil, calcining (drying) the catalyst at about 750° F., and wrapping the foil into a spiral. Such a honeycomb may be appropriate for any of the systems disclosed, particularly the system depicted in FIG. 6, which is described below.

Figure 5:
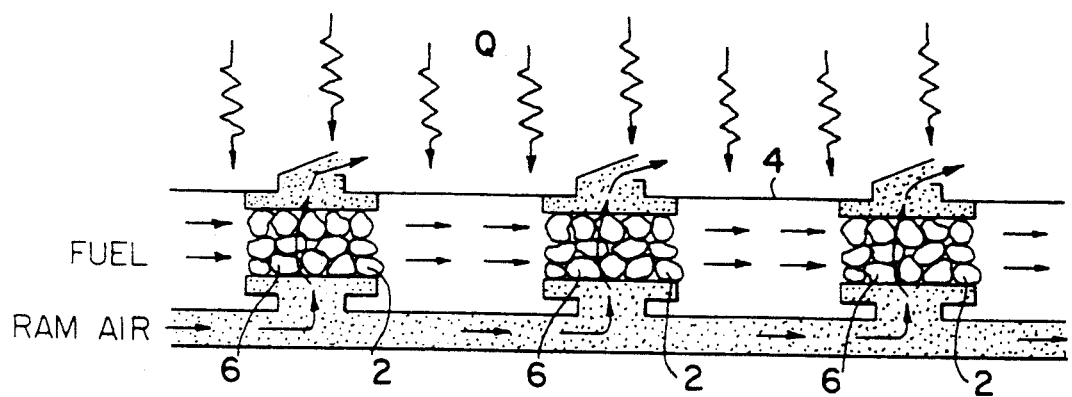
FIG. 5 is a schematic view of an endothermic fuel cooling system of the present invention which uses hot air to provide indirect cooling of an aircraft engine combustion chamber wall.

FIG. 5 depicts a system which uses indirect cooling to cool engine or airframe components. In this case, a plurality of reaction zones 2 containing a catalyst 6 are positioned so they can be contacted with an endothermic fuel stream. The heat of reaction is supplied by hot compressor discharge air or hot ram air from outside the vehicle. As the hot air contacts the reaction zones 2, it heats the catalyst 6 and is in turn cooled. The cooled air is then used to cool hot surfaces such as the wall 4 of an aircraft engine combustion chamber or other engine and airframe components. Alternately, a similar system could be designed to provide both indirect and direct cooling. For example, air for indirect cooling could be cooled as shown in FIG. 5, while the fuel is heated by direct contact with a hot component, thereby cooling the hot component and supplying a portion of the heat of reaction.

Figure 6:
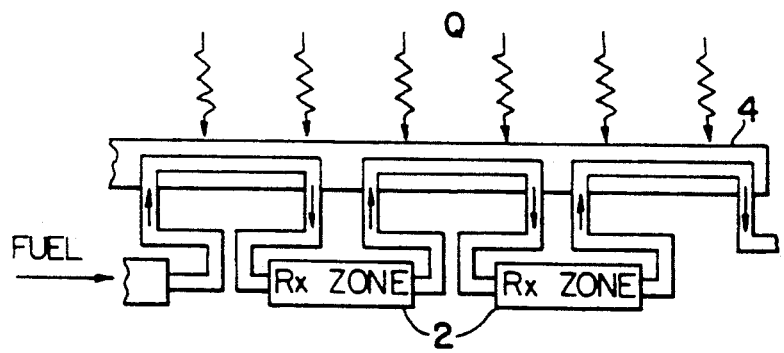
FIG. 6 is a schematic view of an endothermic fuel cooling system of the present invention which uses fuel as a heat transfer fluid.

FIG. 6 shows a cooling system in which the fuel is used as a heat transfer fluid to transfer heat from a hot component, such as an aircraft engine combustion chamber wall 4 or other engine or airframe component, to a plurality of reaction zones 2 positioned in series. The fuel absorbs heat by contact with the combustion chamber wall 4 and is directed to a reaction zone 2 where it partially decomposes over an endothermic decomposition catalyst and is cooled. The cooled, partially decomposed fuel is then reheated by contact with the combustion chamber wall 4 and directed to another reaction zone 2. This sequence may be repeated any number of times to provide sufficient cooling for the combustion chamber wall 4. A heat transfer fluid other than fuel, such as molten salt or liquid metal, could be used in a similar system when the hot component is at a temperature which would cause the fuel to thermally degrade. For example, the heat transfer fluid may be a molten salt such as copper chloride, potassium chloride, or zinc chloride, or a liquid metal such as sodium, potassium, lithium, bismuth, or alloys thereof.

In addition to the heat exchanger-reactors described above, the endothermic fuel system may include means for combusting the reaction product stream in a combustor. The means may be any conventional equipment used to combust hydrocarbons, hydrogen, or carbon monoxide in engines suitable for use onboard high speed vehicles.

The cooling systems of the present invention present several advantages over the prior art. First, they are compatible with liquid distillate hydrocarbon fuels capable of undergoing cracking reactions. As a result, the cooling systems can incorporate all of the benefits associated with such fuels, including higher heat sinks, reaction products with better fuel properties, and catalysts which are less susceptible to poisoning.

Second, the cooling systems of the present invention may be designed in many different configurations, providing the opportunity to optimize a system for a particular application.

Third, the cooling systems of the present invention are compatible with both aerospace and ground-based applications, providing the flexibility to apply this invention to a variety of problems.

It should be understood that the invention is not limited to the particular embodiments shown and described herein, but that various changes and modifications may be made without departing from the spirit or scope of the claimed invention.

We claim:
1. A system for cooling a heat source, comprising:
   (a) an endothermic fuel decomposition catalyst capable of catalytically cracking at least a portion of a liquid distillate hydrocarbon fuel stream into a reaction product stream with a conversion of greater than about 60% at a temperature between about 1100° F. and about 1500° F. to produce a total heat sink of at least about 2025 Btu/lb of fuel, wherein the catalyst comprises a metal selected from the group consisting of platinum, rhenium, rhodium, iridium, ruthenium, palladium, and mixtures thereof or a zeolite and the reaction product stream comprises hydrogen and unsaturated hydrocarbons;
   (b) means for transferring thermal energy from a heat source, which is at a suitable temperature, to the catalyst, wherein the means for transferring thermal energy are capable of cooling the heat source to a temperature less than its original temperature and heating the catalyst to a temperature between about 1000° F. and about 1500° F.; and
   (c) means for contacting the heated catalyst with a liquid distillate hydrocarbon fuel stream at a liquid hourly space velocity of at least about 10 hr$^{-1}$.

2. The system of claim 1 further comprising means for combusting the reaction product stream.

3. The system of claim 1 wherein the heat source is compressor discharge air or ram air.

4. The system of claim 3 further comprising means for contacting the cooled heat source with an engine or airframe component that is hotter than the cooled heat source to cool the engine or airframe component.

5. The system of claim 1 wherein the heat source is an engine or airframe component.

6. The system of claim 1 wherein the catalyst is a zeolite that has an effective pore diameter of about 4 Å to about 8 Å and is a faujasite, chabazite, mordenite, or a silicalite.

7. The system of claim 1 wherein the liquid distillate hydrocarbon fuel comprises hydrocarbons selected from the group consisting of $C_2$ to $C_{20}$ normal paraffins, $C_3$ to $C_{20}$ isoparaffins, conventional aircraft turbine fuels, and mixtures thereof.

8. The system of claim 1 wherein the means for transferring thermal energy comprises a reaction zone containing the endothermic decomposition catalyst in direct thermal contact with the heat source.

9. The system of claim 1 wherein the means for transferring thermal energy comprises a heat transfer fluid selected form the group consisting of the hydrocarbon fuel, air, molten salt, and liquid metal.

10. The system of claim 1 wherein the means for contacting the heated catalyst with the liquid distillate hydrocarbon fuel are capable of establishing a liquid hourly space velocity of about 20 $hr^{-1}$ to about 700 $hr^{-1}$.

11. A system for cooling a heat source, comprising:
   (a) an endothermic fuel decomposition catalyst capable of dissociating at least a portion of a stream of methanol into a reaction product stream at a temperature between about 500° F. and about 1200° F., wherein the catalyst comprises a mixture of copper oxides and zinc oxides and the reaction product stream comprises hydrogen and carbon monoxide;
   (b) means for transferring thermal energy from a heat source, which is at a suitable temperature, to the catalyst, wherein the means for transferring thermal energy are capable of cooling the heat source to a temperature less than its original temperature and heating the catalyst to a temperature between about 500° F. and about 1200° F.; and
   (c) means for contacting the heated catalyst with the methanol at a liquid hourly space velocity of at least about 10 $hr^{-1}$.

12. The system of claim 11 wherein the heat source is compressor discharge air or ram air.

13. The system of claim 12 further comprising means for contacting the cooled heat source with an engine or airframe component that is hotter than the cooled heat source to cool the engine or airframe component.

14. The system of claim 11 wherein the heat source is an engine or airframe component.

15. An endothermic fuel system for cooling a combustion chamber wall of an aircraft engine or a ground-based gas turbine engine, comprising:
   (a) a reaction zone disposed in a combustion chamber wall of an aircraft engine or a ground-based gas turbine engine, wherein the reaction zone is in direct thermal contact with the combustion chamber wall, which is at a suitable temperature, such that thermal energy can flow directly from the combustion chamber wall to the reaction zone to cool the combustion chamber wall to a temperature less than its original temperature and heat the reaction zone to a temperature between about 400° F. and about 1500° F.;
   (b) an endothermic fuel decomposition catalyst positioned in the reaction zone such that the catalyst is at substantially the same temperature as the reaction zone, wherein the catalyst comprises a metal selected from the group consisting of nickel, cobalt, platinum, rhenium, rhodium, iridium, ruthenium, palladium, and mixtures thereof, or a zeolite and is capable of endothermically decomposing at least a portion of an endothermic fuel stream at a temperature between about 400° F. and about 1500° F.; and
   (c) means for directing the fuel stream into the reaction zone such that the fuel stream contacts the heated catalyst, absorbs a heat of reaction, and decomposes into a reaction product stream.

16. The system of claim 15 wherein the catalyst is a zeolite that is capable of catalytically cracking the endothermic fuel stream into a reaction product stream with a conversion of greater than about 60% at a temperature between about 1100° F. and about 1500° F. to produce a total heat sink of at least about 2025 Btu/lb of fuel and the endothermic fuel comprises hydrocarbons selected from the group consisting of $C_2$ to $C_{20}$ normal paraffins, $C_3$ to $C_{20}$ isoparaffins, conventional aircraft turbine fuels, and mixtures thereof.

17. The system of claim 15, wherein the catalyst is in the form of pellets.

18. The system of claim 15, wherein the reaction zone has walls and the catalyst is a coating on the walls of the reaction zone.

19. The system of claim 15, wherein the reaction zone is in the form of a honeycomb.

20. An endothermic fuel system for indirectly cooling an engine or airframe component, comprising:
   (a) a reaction zone;
   (b) an endothermic fuel decomposition catalyst positioned in the reaction zone, wherein the catalyst comprises a metal selected from the group consisting of nickel, cobalt, platinum, rhenium, rhodium, iridium, ruthenium, palladium, mixtures thereof, or a zeolite and is capable of endothermically decomposing at least a portion of an endothermic fuel stream at a temperature between about 400° F. and about 1500° F.;
   (c) means for contacting the catalyst with the endothermic fuel stream;
   (d) means for transferring thermal energy from a compressor discharge air stream or a ram air stream, which is at a suitable temperature, to the reaction zone such that the reaction zone and the catalyst are heated to a temperature between about 400° F. and about 1500° F. and the air stream is cooled to a temperature less than its original temperature; and
   (e) means for contacting the cooled air stream with a first engine or airframe component that requires cooling to cool the first engine or airframe component.

21. The system of claim 20, wherein the catalyst is a zeolite that is capable of catalytically cracking the endothermic fuel stream into a reaction product stream with a conversion of greater than about 60% at a temperature between about 1100° F. and about 1500° F. to produce a total heat sink of at least about 2025 Btu/lb of fuel and the endothermic fuel stream comprises hydrocarbons selected from the group consisting of $C_2$ to $C_{20}$ normal paraffins, $C_3$ to $C_{20}$ isoparaffins, conventional aircraft turbine fuels, and mixtures thereof.

22. The system of claim 20, further comprising:
   (f) means for contacting the fuel stream with a second engine or airframe component that is hotter than the fuel stream before contacting the catalyst with the fuel stream to heat the fuel stream and cool the second engine or airframe component.

23. The system of claim 22, wherein the first engine or airframe component and the second engine or airframe component are both a wall of a combustion chamber.

* * * * *